Feb. 14, 1967    K. A. BEIER    3,303,719
VISCOUS TORSIONAL VIBRATION DAMPER WITH CENTERING
AND SEALING MEANS
Filed Jan. 21, 1965

INVENTOR.
KURT A. BEIER
BY Lockwood, Woodard, Smith & Weikart
Attorneys

United States Patent Office 3,303,719
Patented Feb. 14, 1967

3,303,719
VISCOUS TORSIONAL VIBRATION DAMPER WITH CENTERING AND SEALING MEANS
Kurt A. Beier, Morgantown, Ind., assignor to Schwitzer Corporation, Indianapolis, Ind., a corporation of Indiana
Filed Jan. 21, 1965, Ser. No. 426,760
5 Claims. (Cl. 74—574)

This invention relates generally to torsional vibration dampers of the viscous fluid type and particularly to such a damper having means which function both as seals and further serve to center, both axially and radially, the inertia element with respect to the drive or hub member.

Viscous type dampers may be formed by a hub member which is adapted for attachment to a shaft subject to torsional vibration such as the crankshaft of an internal combustion engine. The hub member has an annular, radially extending flange which is accommodated within an annular cavity formed within an inertia element which encircles the hub. The cavity is filled with a viscous fluid and the fluid friction between the faces of the hub flange and the inertia member walls provides the necessary vibration damping function. It is customary to provide resilient, annular lip seals between the hub and the encircling inertia element to retain the fluid in the cavity. An example of the type of construction referred to is disclosed in U.S. Patent 3,117,467. In such structures, it is important to hold the thickness of the fluid film between the radial hub flange and the cavity walls to the desired thickness, that is, the radially extending hub flange must be accurately held in centered relation with respect to the inertia member walls.

It is the primary object of the present invention to provide a viscous torsional vibration damper in which the sealing means is arranged to cooperate with the hub flange element and the inertia element so that the sealing means functions to center, or uniformly space, the adjacent surfaces of these elements both axially and radially.

A further object of the present invention is to provide a viscous damper in which the vibration damping, viscous fluid film is held to a desired thickness by the sealing elements which retain the fluid within the damper.

These and other objects will become apparent as the description proceeds with reference to the accompanying drawings in which.

Figure 1:
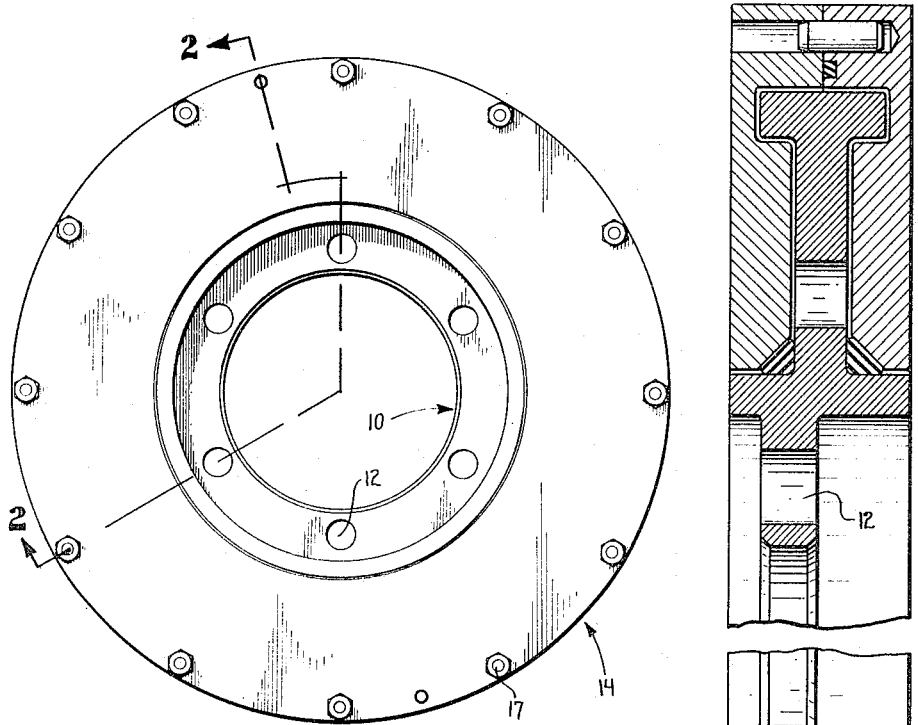
FIG. 1 is a front plan view of a damper assembly embodying the present invention.
Figure 2:
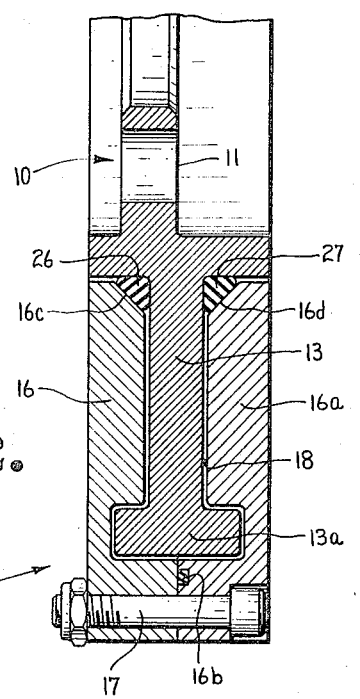
FIG. 2 is a side, sectional view taken generally along the line 2—2 of FIG. 1.

Referring to the drawings, the assembly embodying the present invention comprises a generally annular shaped driving member 10, having a radially inwardly extending portion 11. The inwardly extending portion 11 is adapted to be mounted on a hub, accessory drive pulley, or similar means conventionally associated with the crankshaft of a reciprocating, internal combustion engine. A plurality of apertures 12 may be provided to receive bolts for attaching the driving member as described above. The driving member 10 is further provided with a radially outwardly extending flange 13 (FIG. 2). The flange 13 is generally T-shaped in cross section, the transverse portion being indicated at 13a, this configuration providing increased surface area for the flange.

The driven inertia member, indicated generally at 14 is formed of two annular sections 16 and 16a which are held in assembled relation by means of bolts 17 or other fastening means. The members 16 and 16a are designed to form a radially outwardly extending cavity 18, which freely accommodates the radially extending flange 13 of the driving member. An annular elastic ring 16b provides a fluid tight seal between the inertia member components 16 and 16a.

Interposed between the driven member 14 and the driving member 10 is an elastic means which includes two annular elastic rings 26 and 27, which are arranged in side-by-side relation adjacent to the open, inner end of the cavity 18. As may best be seen in FIGURE 2, the inner margins of the driven member components 16 and 16a may be cut away, as indicated at 16c and 16d to provide an annular groove on each side of and adjacent to the outwardly extending flange 13. The rings confined within the annular grooves are compressively stressed due to the axial and radial loading to which they are subjected. These rings 26 and 27, may be formed of rubber or a similar elastic composition being of circular, rectangular or wedge cross section and act as seals for the cavity 18 and, additionally, serve to define the fluid film thickness between the flange 13 and the cavity faces as will subsequently be described.

In operation, with the driving member turning with a shaft subject to torsional vibration, the vibration will be damped by the friction of the fluid film existing between the inner faces of the cavity and the faces of the flange 13. Since the fluid friction is related to the thickness of the fluid film, it is important that the film thickness be controlled by maintaining the flange 13 accurately centered within the cavity 18. As will be evident from FIGURE 2, since the elastic rings 26 and 27 are subjected to both axial and radial loads, the cavity formed in the driven member 14 is maintained in proper position with relation to the flange 13, that is, the flange 13 is centered within the cavity. While the elastic rings 26 and 27 are disclosed in FIGURE 2 as being of uniform size and resiliency characteristics, it will be understood that one of the rings might be altered in size or in resiliency characteristics and an asymmetrical fluid film thickness might be obtained should such an arrangement be desirable. While the cut forming the grooves indicated at 16c and 16d may be rectilinear, it will be understood that the groove might be square or arcuate in cross sectional configuration while still maintaining the fundamental functional advantage of the present invention, that is, the placing of the elastic rings under both axial and radial compressive loading and providing proper spacing from the adjacent walls and sealing the fluid.

While the invention has been disclosed and described in some detail in the drawings and foregoing description, they are to be considered as illustrative, and not restrictive in character, as other modifications may readily suggest themselves to persons skilled in this art and within the broad scope of the invention, reference being had to the appended claims.

The invention claimed is:

1. A torsional vibration damper assembly for mounting in operative relation to the crankshaft of an internal combustion engine comprising a generally annular driving hub or member having a radially inwardly extending surface for concentric attachment to a crankshaft and having a radially outwardly extending flange, a driven inertia member mounted concentrically of said driving member and having a central aperture therein accommodating said driving member, said driven member being provided with a radially outwardly extending cavity freely accommodating said outwardly extending flange of said driving member, the inner margins of said driven member adjacent said cavity being formed to provide an annular groove on each side of and adjacent to said outwardly extending flange, elastic rings interposed between said driving and driven members and disposed within said annular grooves under compressive stress both radially and axially, said elastic rings sealing said cavity to form a chamber, and a viscous fluid within said chamber, the axial and compressive load exerted on said rings serving to provide forces centering said outwardly extending flange within said cavity and establishing the thickness of the fluid film between said cavity faces and said outwardly extending flange.

2. A torsional vibration damper assembly for mounting in operative relation to the crankshaft of an internal combustion engine comprising a generally annular driving member adapted for concentric attachment to a crankshaft and having a radially outwardly extending flange, a driven inertia member mounted concentrically of said driving member and having a central aperture therein accommodating said driving member, said driven member being provided with a radially outwardly extending cavity freely accommodating said outwardly extending flange of said driving member, the inner margins of said driven member adjacent said cavity being formed to provide an annular groove on each side of and adjacent to said outwardly extending flange, elastic rings interposed between said driving and driven members and disposed within said annular grooves under compressive stress both radially and axially, said elastic rings sealing said cavity to form a fluid chamber, and a viscous fluid within said chamber, the axial and compressive stress exerted on said rings serving to provide forces controlling the position of said outwardly extending flange within said cavity and establishing the thickness of the fluid film between said cavity faces and said outwardly extending flange.

3. A torsional vibration damper assembly for mounting in operative relation to the crankshaft of an internal combustion engine comprising a generally annular driving member adapted for concentric attachment to a crankshaft and having an extending flange, a driven inertia member mounted concentrically of said driving member, said driven member being provided with an annular cavity freely accommodating said extending flange of said driving member, the inner margins of said driven member adjacent said cavity being formed to provide an annular groove on each side of and adjacent to said outwardly extending flange, elastic rings interposed between said driving and driven members and disposed within said annular grooves under compressive stress both radially and axially, said elastic rings sealing said cavity to form a fluid chamber, and a viscous fluid within said chamber, the axial and compressive stress exerted on said rings serving to provide forces controlling the position of said extending flange within said cavity and establishing the thickness of the fluid film between said cavity faces and said extending flange.

4. A torsional vibration damper assembly for mounting in operative relation to the crankshaft of an internal combustion engine comprising a generally annular driving member having a radially inwardly extending surface for concentric attachment to a crankshaft and having a radially outwardly extending flange, a driven inertia member mounted concentrically of said driving member and having a central aperture therein accommodating said driving member, said driven member being provided with a radially outwardly extending cavity freely accommodating said outwardly extending flange of said driving member, elastic rings interposed between said driving and driven members and disposed at the base of said flange and cavity, said rings being under compressive stress both radially and axially, said elastic rings sealing said cavity to form a fluid chamber, and a viscous fluid within said chamber, the axial and compressive stress exerted on said rings serving to provide forces centering said outwardly extending flange within said cavity and establishing the thickness of the fluid film between said cavity faces and said outwardly extending flange.

5. A torsional vibration damper assembly for mounting in operative relation to the crankshaft of an internal combustion engine comprising a generally annular driving member adapted for concentric attachment to a crankshaft and having an extending flange, a driven inertia member mounted concentrically of said driving member, said driven member being provided with an annular cavity freely accommodating said extending flange of said driving member, elastic rings interposed between said driving and driven members and disposed at the base of said flange and said cavity, said rings being under compressive stress both radially and axially, said elastic rings sealing said cavity to form a fluid chamber, and a viscous fluid within said chamber, the axial and compressive stress exerted on said rings serving to provide forces controlling the position of said extending flange within said cavity and establishing the thickness of the fluid film between said cavity faces and said extending flange.

References Cited by the Examiner

UNITED STATES PATENTS

| | | | |
|---|---|---|---|
| 2,722,849 | 11/1955 | O'Connor | 74—574 |
| 2,724,893 | 11/1955 | O'Connor et al. | 74—574 |
| 3,117,467 | 1/1964 | Paulsen | 74—574 |

FOREIGN PATENTS

| | | |
|---|---|---|
| 867,805 | 11/1940 | France. |
| 508,513 | 7/1939 | Great Britain. |

FRED C. MATTERN, JR., *Primary Examiner.*

W. S. RATLIFF, *Assistant Examiner.*